United States Patent [19]

Doshi et al.

[11] Patent Number: 4,624,827

[45] Date of Patent: Nov. 25, 1986

[54] NUCLEAR REACTOR CONTROL ROD HAVING A REDUCED WORTH TIP

[75] Inventors: Pratap K. Doshi; John F. Wilson, both of Murrysville Boro, Pa.

[73] Assignee: Westinghouse Electric Corp., Pittsburgh, Pa.

[21] Appl. No.: 633,774

[22] Filed: Jul. 23, 1984

[51] Int. Cl.⁴ .................................................. G21C 7/10
[52] U.S. Cl. ....................................................... 376/333
[58] Field of Search .................................. 376/327, 333

[56] References Cited

U.S. PATENT DOCUMENTS

| | | |
|---|---|---|
| 3,230,147 | 1/1966 | Hitchcock . |
| 3,255,086 | 6/1966 | Hitchcock . |
| 3,975,233 | 8/1976 | Wende .................... 376/333 |
| 4,169,759 | 10/1979 | Bevilacqua . |
| 4,172,762 | 10/1979 | Anthony et al. . |
| 4,326,919 | 4/1982 | Hill . |
| 4,432,934 | 2/1984 | Gjertsen et al. .................... 376/333 |
| 4,451,428 | 5/1984 | Nishimura et al. . |

FOREIGN PATENT DOCUMENTS

| | | | |
|---|---|---|---|
| 51-37396 | 3/1976 | Japan ................................. 376/333 |
| 0015985 | 2/1977 | Japan ................................. 376/333 |
| 0029597 | 3/1977 | Japan ................................. 376/333 |
| 0022632 | 7/1978 | Japan ................................. 376/333 |

*Primary Examiner*—Harvey E. Behrend

[57] ABSTRACT

A control rod with a "reduced worth" tip is provided for a nuclear reactor which includes an elongated tubular cladding with its opposite ends closed and having a plurality of pellets of two different types disposed in its lower end portion in an end-to-end relationship. One type of pellets is formed of a neutron absorbing material, such as $B_4C$, whereas, the other type of pellets is formed of an inert material, such as $ZrO_2$. The absorber pellets and the inert pellets are interspaced between one another in the lower end of the rod so as to gradually reduce the rate of change of the neutron flux experienced at the rod's lower end portion as it moves in and out of the fuel assembly to thereby alleviate pellet-clad-interaction and thus reduce the likelihood of fuel rod failure. In one embodiment, the axial heights of the absorber pellets progressively increase from the bottom to the top of the rod's lower end portion while the axial heights of the interspaced inert pellets remain constant. In a second embodiment, the axial heights of the inert pellets progressively decrease from the bottom to the top of the rod's lower end portion while the axial heights of the interspaced absorber pellets remain constant.

5 Claims, 4 Drawing Figures

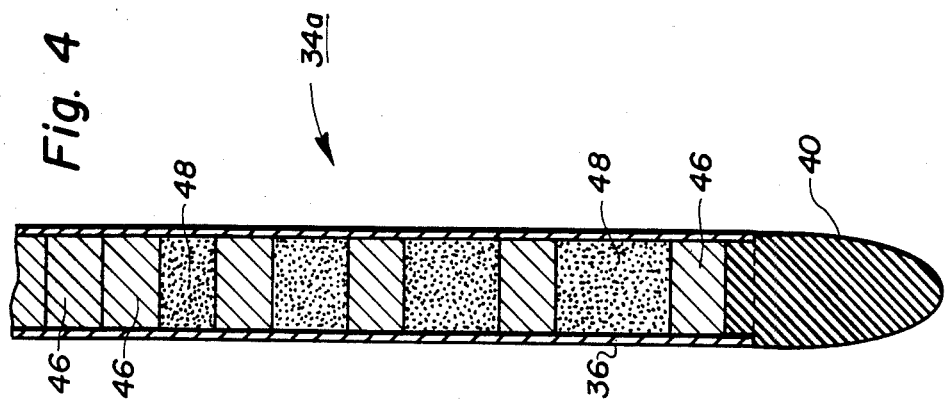
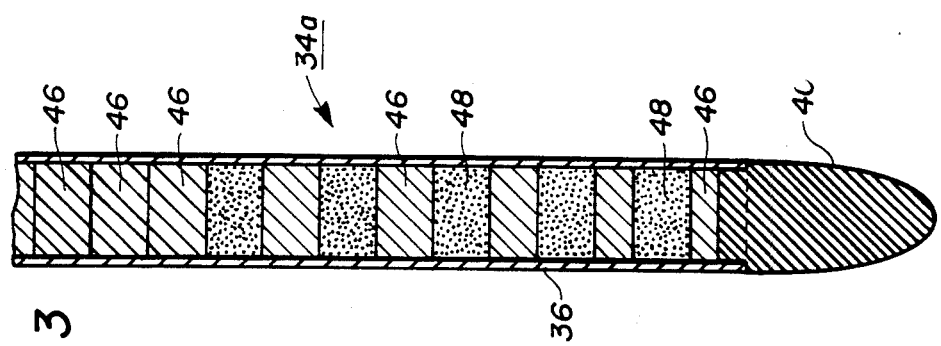
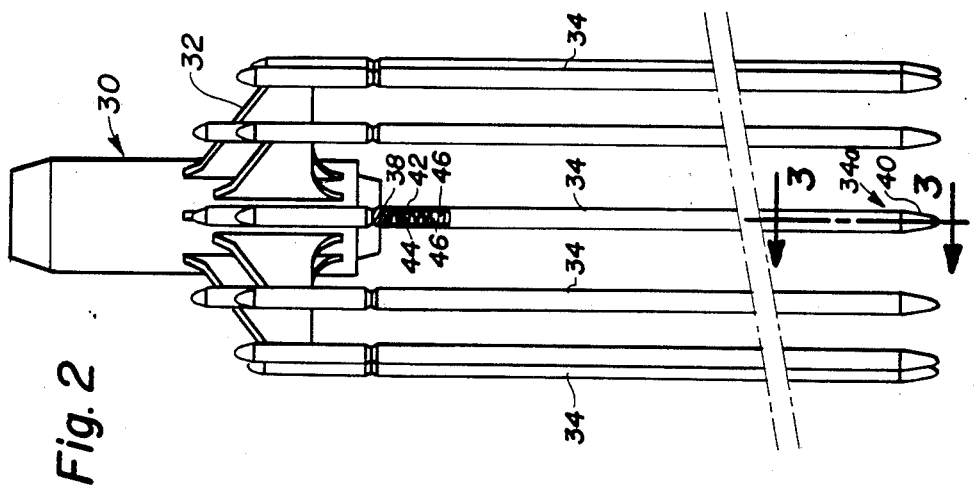

NUCLEAR REACTOR CONTROL ROD HAVING A REDUCED WORTH TIP

BACKGROUND OF THE INVENTION

The present invention relates generally to nuclear reactors and, more particularly, is directed to an improved control rod for use with a nuclear fuel assembly in a pressurized water reactor.

In most nuclear reactors the core portion is comprised of a large number of elongated fuel elements or rods grouped in and supported by frameworks referred to as fuel assemblies. The fuel assemblies are generally elongated and receive support and alignment from upper and lower transversely extending core support plates. Conventional designs of these fuel assemblies include a plurality of fuel rods and hollow tubes or guide thimbles held in an organized array by grids spaced along the fuel assembly length and attached to the guide thimbles. Top and bottom nozzles on opposite ends thereof are secured to the guide thimbles in thereby forming an integral fuel assembly. Generally, in most reactors, a fluid coolant such as water, is directed upwardly through aperatures in the lower core support plate and along the various fuel assemblies to receive the thermal energy therefrom.

One method for controlling the reactivity within the core is through the employment of neutron absorbing elements or rods, commonly referred to as "control rods". One common arrangement utilizing control rods in association with a fuel assembly can be seen in U.S. Pat. No. 4,326,919; granted to Donald J. Hill. Shown is a fixed array of control rods supported at their upper ends by a spider assembly, which in turn, is connected to a control rod drive mechanism that vertically raises and lowers (referred to as a stepping action) the control rods into and out of the hollow guide thimbles of the fuel assembly. The typical construction of a control rod used in such an arrangement is in the form of an elongated metallic tube or cladding having a neutron absorbing material disposed within the tube and with end plugs at opposite ends thereof for sealing the absorber material within the tube. Generally, the neutron absorbing material is in the form of a stack of closely packed ceramic or metal pellets which only partially fill the tube, leaving a void space or axial gap between the top of the pellets and the upper end plug in defining a plenum chamber for receiving gasses generated during the control operation. A coil spring is disposed within this plenum chamber and held in a state of compression between the upper end plug and the top pellet so as to maintain the stack of pellets in their closely packed arrangement during stepping of the control rod.

The inner diameter of the guide tubes is usually chosen to be the maximum permitted by the fuel assembly lattice in order that the maximum possible diameter control rod can be inserted therein. It is desirable to maximize the diameter of the absorber pellets in the control rod because the absorption effectiveness of the rods is very strongly dependent, particularly in thermal neutron reactors, on the surface area of the pellets. For this reason, and to promote heat transfer, there usually are narrow clearances between the absorber pellets and the control rod clad (cladding), and between the control rod and its guide tube.

The normal operation of the control rods usually consists of several steps of the drive mechanism at small increments, such as at 0.6 inch per step. When the control rod is moved, there is a step increase (abrupt change in neutron flux) in power in the pellets adjacent the end of the rod. This increase in pellet power results in thermal expansion of the pellets into the clad, which causes a relatively high tensile strain rate in the clad. This, along with chemical attack on the inside of the pellet causes pellet clad interaction (PCI). PCI can damage or destroy the effectiveness of the clad or even cause a rod to rupture; all of which equates to premature rod failure and a shortened useful life thereof.

Early failure of a control rod caused from the neutron flux density was recognized in U.S. Pat. No. 4,172,762, granted to Anthony et al. Anthony et al solution to the problem was the design of a control rod wherein the pellets in the lower end of the rod have a radius smaller than that of the other pellets and are wrapped with a sleeve having a linear compressibility sufficient to accomodate exposure-induced radial expansion of the end pellets without producing excessive clad strain. They suggest the sleeve be a sponge material made from type 347 stainless steel at 22.5% theoretical density to accomplish their objectives. In order to do this, the (boron carbide) pellets must have a smaller diameter at the tip of the rod so that the cylindrical sponge sleeve can be inserted between the clad (inside diameter) and the boron carbide pellets (outside diameter). Although such design may have its benefits, the requirement that some pellets have a smaller diameter than others and the addition of an extra sleeve not only adds material costs, but also, increases the manufacturing steps and requires more time which results in a more expensive control rod.

Although Hitchcock, in U.S. Pat. Nos. 3,230,147 and 3,255,086, did not specifically recognize the pellet-clad-interaction (PCI) problem, he set forth two different control rod designs, which when considered from a nuclear standpoint, can be considered to be similar to a movable burnable poison rod in that they permit control of the radial peaking factors. In one design, the rod is cone-shaped or tapered from one end to the other in creating a graduated form of neutron absorbing capacity so that movement of the rod can take place without creating significant zones of stepwise change of reactivity in the nuclear reactor core structure. In the other design, the rod is made in a series of four parts with the neutron absorbing capacity of the parts increasing from one part to the next so as to create the tapered effect. In these two designs, the basic concept is to have a control rod having a length which is twice the core height to enable the rod to either be inserted through the bottom of the core or withdrawn from the top of the core. Present day pressurized water reactors (PWRs) are not designed for control rods projecting below the bottom core plate of the reactor. Further, in Hitchcock, the lower parts of the rod are made of varying absorber materials (thin-walled and thick-walled boron and mild steel) with the upper part filled with boron graphite. In practice, the boron steel and mild steel will become embrittled in a short time so the design is not realistic from a materials standpoint. Still further, the lower parts are filled with water which makes them perform as "flux trap" devices. Besides the above disadvantages, such rod designs are complex in structure and expensive to manufacture.

Consequently, a need still exists for a control rod adapted to be used with a pressurized water reactor which is not only simple in structure and thus less costly to manufacture but, in addition thereto, a control rod so designed to alleviate pellet-clad-interaction (PCI) and thereby prolong the useful life of a rod.

SUMMARY OF THE INVENTION

The present invention provides an improved control rod design to satisfy the aforementioned needs. Underlying the present invention is the recognition that the sudden change in power in the pellets adjacent to the tips of the control rods causes pellet-clad-interaction resulting in early rod failure. The solution to this problem, in accordance with the present invention, is a control rod design having a unique arrangement of absorber materials at the tip of the rod which creates a "reduced worth" tip so as to minimize the step increase in neutron flux (hence, pellet power) during control rod movement. Thus, when the rod moves, the change in local power seen by the pellets adjacent to the tip of the rod is greatly reduced and rather than being an abrupt change, the change is gradual. This reduces the change in pellet power, temperature, thermal expansion and clad strain rate which thereby reduces the probability of PCI and the likelihood of rod failure.

Accordingly, the present invention is directed to an improved control rod for use with a nuclear reactor fuel assembly which comprises: (a) an elongated tubular cladding; (b) means for closing the opposite ends of the cladding; (c) a first plurality of pellets of a first type disposed within the cladding in an end-to-end relationship; (d) a second plurality of pellets of a second type disposed within the cladding in an end-to-end relationship; (e) one of the first or second types of pellets being formed of a neutron absorbing material; and (f) the other one of the first or second types of pellets being formed of an inert material of low neutron absorbing capacity with the inert pellets being interspaced between the neutron absorbing pellets at one end portion of the cladding so as to gradually reduce the rate of change of the neutron flux experienced at the one end portion of the cladding as the control rod moves in and out of the fuel assembly to thereby reduce the likelihood of control rod failure. Preferably, the axial heights of at least one of the first or second plurality of pellets varies from pellet to pellet.

More particularly, the neutron absorbing pellets and the inert pellets are generally cylindrical in form, having diameters generally equal to one another. In one embodiment, the axial heights of the neutron absorbing pellets progressively increase from a lower end toward an upper end of the control rod end portion and the inert pellets, which are interspaced between the neutron absorbing pellets, are of equal axial heights. In a second embodiment, the axial heights of the inert pellets progressively decrease from a lower end toward an upper end of the control rod end portion and the neutron absorbing pellets, which are interspaced between the inert pellets, are of equal axial heights.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 2 is an elevational view of the spider assembly and attached control rods, being removed from the fuel assembly seen in FIG. 1.

FIG. 3 is an enlarged, sectional view of the lower end portion of one of the control rods as seen along line 3—3 of FIG. 2, showing the axial heights of the neutron absorbing pellets progressively increasing from the bottom to the top of the lower end portion of the rod whereas the interspaced inert pellets are of equal axial heights.

FIG. 4 is a view similar to FIG. 3, but shows a second embodiment of the invention wherein the axial heights of the inert pellets progressively decrease from the bottom to the top of the lower end portion of the rod whereas the interspaced neutron absorbing pellets are of equal axial heights.

DETAILED DESCRIPTION OF THE INVENTION

Figure 1:
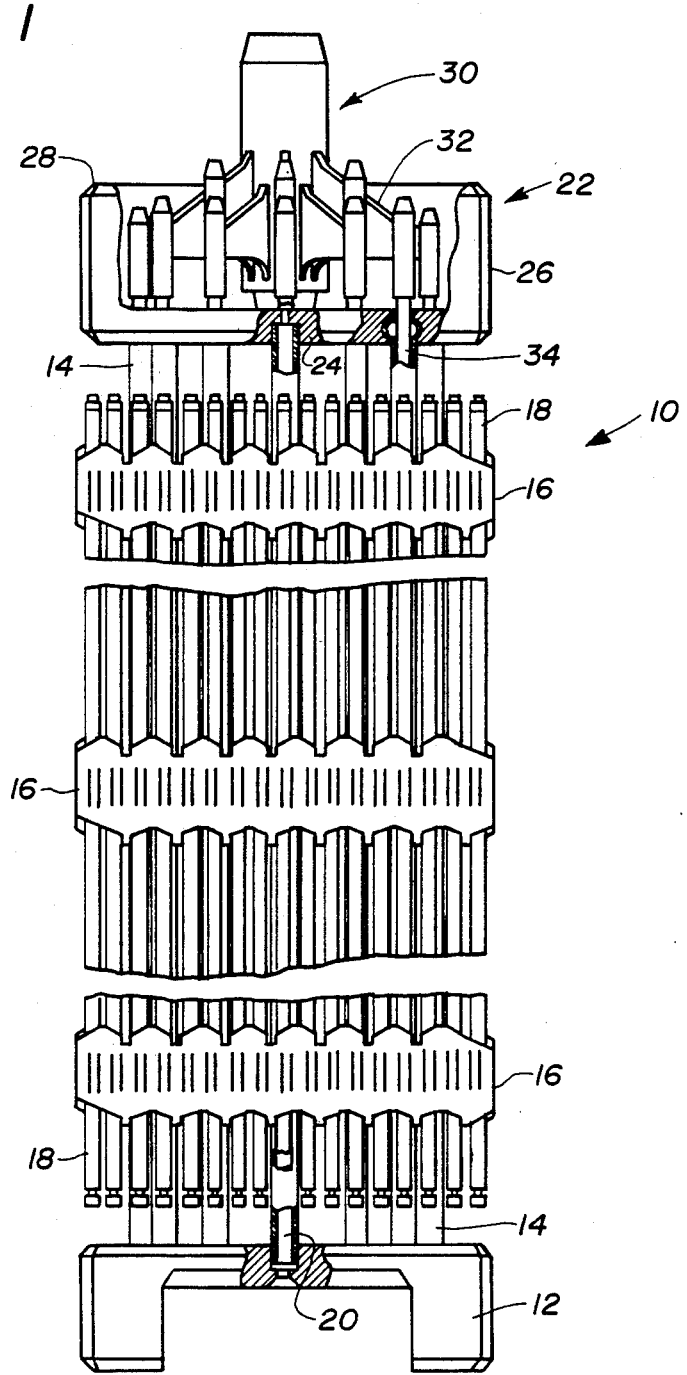
FIG. 1 is a partially sectioned, elevational view of a conventional nuclear fuel assembly, being shown in vertical foreshorten form and with parts broken away for clarity, having a spider assembly disposed above the fuel assembly and supporting a plurality of control rods extending down through the guide tubes of the fuel assembly, the rods being formed in accordance with the principles of the present invention.

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

IN GENERAL

Referring now to the drawings, and particularly to FIG. 1, there is shown an elevational view of a conventional fuel assembly, represented in vertically foreshortened form and being generally designated by the numeral 10. Fuel assembly 10 is of the type used in a Pressurized Water Reactor (PWR) and basically comprises a lower end structure or bottom nozzle 12 for supporting the assembly on the lower core plate (not shown) in the core region of a reactor (not shown); a number of longitudinally extending guide tubes or thimbles 14 projecting upwardly from the bottom nozzle 12; a plurality of transverse grids 16 axially spaced along the guide thimbles 14; an organized array of elongated fuel rods 18 transversely spaced and supported by the grids 16; an instrumentation tube 20 located in the center of the assembly; and an upper end structure or top nozzle 22, generally designated by the numeral 22, attached to the upper ends of the guide thimbles 14 to form an integral assembly capable of being conventionally handled without damaging the assembly components.

The top nozzle 22 includes a transversely extending adapter plate 24 having upstanding sidewalls 26 (the front wall being partially broken away) secured to the peripheral edges thereof in defining an enclosure or housing. An annular flange 28 is secured to the top of the sidewalls 26. Suitably clamped to the annular flange 28 are leaf springs (not shown) which cooperate with the upper core plate (not shown) in a conventional manner to prevent hydraulic lifting of the fuel assembly by upward coolant flow, while allowing for changes in fuel assembly length due to core induced thermal expansion and the like. Disposed within the opening defined by the annular flange 28 of top nozzle 22 is a conventional spider assembly, generally indicated by the numeral 30, having radially extending flukes 32 connected to the upper ends of control rods 34 which are adapted to be inserted down through the guide thimbles 14 of fuel assembly 10. The spider assembly 30 is connected to a control mechanism (not shown) which is operable in a well known manner to move the rods 34 in relatively small incremental steps (approximately 0.6 inch) in and out of the guide thimbles 14 so as to control the reactivity of the reactor. In that the fuel assembly 10 and the spider assembly 30 do not form part of the present invention, but are merely for illustrational purposes in representing the operative environment for use of control rods 34, which are the subject of the present invention, a further description thereof will not be given. A more detailed description of fuel assembly 10 and spider assembly 30 can be obtained by referring to the above referenced Hill patent, U.S. Pat. No. 4,326,919.

IMPROVED CONTROL ROD

In accordance with the principles of the present invention, control rods 34 have been designed to minimize and thereby prevent a sudden change in power (neutron flux) in the pellets adjacent the tips of the rods as they are stepped in and out of the guide thimbles 14 of fuel assembly 10. The design utilizes a unique arrangement of absorber material at the tip of the control rods to alleviate pellet-clad-interaction and thereby reduce the likelihood of early rod failure.

Now, with reference to FIGS. 2, 3, and 4, the construction of the control rods 34 will be described in detail. In that each rod is identical, the following description will be directed to the construction of only the center rod as seen in FIG. 2. Control rod 34 broadly includes an elongated, thin-walled, metallic tube or cladding 36 (sometimes referred to as a clad) and means in the form of respective upper and lower end plugs 38,40 for closing or sealing the opposite ends of the cladding 36. Preferably, the rod cladding 36 is stainless steel having a generally constant diameter. The upper end plug 38 has an upwardly extending integrally formed stem section with an externally threaded end (not shown) for connection to the outward end of the radial fluke 32 of the spider assembly 30 in a conventional manner. The lower end plug 40 is cone-shaped. Slidably disposed within the cladding 36 and resting on the lower end plug 40 is a stack of closely packed pellets (the specific arrangement and characteristics thereof will be described shortly hereafter) which only partially fill the cladding 36, leaving a void space or axial gap between the top of the pellets and the upper end plug 38 in defining a plenum chamber 42 for receiving gases generated during the control operation. As conventional, a coil spring 44 is disposed within this plenum chamber 42 and held in a state of compression between the upper end plug and the top pellet to thereby maintain the stack of pellets in their closely packed arrangement during stepping of the control rod 34.

As stated above, the control rod 34 contains a stack or plurality of pellets arranged in an end-to-end relationship with the pellets in the lower end portion of the rod, hereinafter designated 34a, uniquely arranged in accordance with the principles of the invention so as to alleviate pellet-clad-interaction as the rod 34 is raised and lowered in the guide thimbles 14 of the fuel assembly 10. More particularly, as seen in FIG. 3 which represents one embodiment of the invention and in FIG. 4 which represents a second embodiment of the invention, the rod's lower end portion 34a includes a first plurality of pellets of a first type and a second plurality of pellets of a second type, disposed within the cladding 36 in an end-to-end relationship. One type of pellets, pellets 46, preferably are formed of a material having a generally high neutron absorbing capacity, such as pelletized boron carbide ($B_4C$), and the other type of pellets, pellets 48, are formed of an inert material having a generally low neutron absorbing capacity, such as $ZrO_2$. In this lower end portion 34a of rod 34, the different types of pellets, absorber pellets 46 and inert pellets 48, are interspaced between one another while the remaining portion of the rod 34, above the lower end portion 34a, only contains the absorber pellets 46 as can been seen in FIGS. 2, 3 and 4.

Arrangement of pellets 46,48 in an alternating sequence in the rod's lower end portion 34a results in a "reduced worth" tip which is defined as one portion of the rod (lower end portion 34a) having a neutron absorbing capacity being reduced relative to the neutron absorbing capacity of the remaining portion of the rod. As used herein "reduced worth" includes a stepwise change in neutron absorbing capacity, as well as, a gradient change in neutron absorbing capacity. Such alternating pellet arrangement in the rod's lower end portion 34a translates into a controlled reactivity change of an increasing and decreasing linear fashion as the control rod is raised and lowered and has the overall effect of gradually reducing the rate of change of the neutron flux experienced at the rod's lower end portion 34a as the control rod 34 moves in and out of the fuel assembly 10. Such design arrangement prevents sudden and abrupt reactivity changes in thereby reducing the likelihood of pellet-clad-interaction and the resulting premature rod failure as experienced in prior art designs.

Preferably, the absorber pellets 46 and the inert pellets 48 are cylindrical in shape with the diameters of the absorber pellets 46 being generally equal to one another and generally equal to the diameters of the inert pellets 48 which have generally equal diameters. The axial heights of the alternating pellets 46,48 in the rod's lower end portion 34a may be of generally equal or constant values, however, it is preferred to vary the axial heights of one type of pellets while the other interspaced pellets remain of a generally constant axial height. In the embodiment shown in FIG. 3, the axial heights of the absorber pellets 46 progressively increase (from pellet to pellet) from the bottom to the top of the rod's lower end portion 34a, whereas, the inert pellets 48, which are interspaced between the absorber pellets 46, are of generally equal axial heights. However, in the embodiment shown in FIG. 4, the axial heights of the inert pellets 48 progressively decrease (from pellet to pellet) from the bottom to the top of the rod's lower end portion 34a, whereas, the absorber pellets 46, which are interspaced between the inert pellets 48, are of generally equal axial heights.

It is thought that the control rod of the present invention and many of its attendant advantages will be understood from the foregoing description and it will be apparent that various changes may be made in form, construction and arrangement thereof without departing from the spirit and scope of the invention or sacrificing all of its material advantages, the form hereinbefore described being merely a preferred or exemplary embodiment thereof.

We claim:

1. In a nuclear reactor having a fuel assembly and a control rod movable in and out of the fuel assembly for controlling the reactivity of the reactor, the control rod comprising:
   (a) an elongated tubular cladding;
   (b) means for closing the opposite ends of said cladding;
   (c) a first plurality of pellets of a first type disposed within said cladding in an end-to-end relationship; and
   (d) a second plurality of pellets of a second type disposed within said cladding in an end-to-end relationship;
   (e) one of said first and second types of pellets being formed of a material having a generally high neutron absorbing capacity;
   (f) the other of said first and second types of pellets being formed of an inert material having a generally low neutron absorbing capacity;
   (g) said pellets of said first and second pluralities thereof of said first and second types being cylindrical with their respective diameters being generally equal;
   (h) said inert pellets being interspaced between said high neutron absorbing pellets at a lower end portion of said cladding with the remaining portion of said cladding above said lower end portion containing only said high neutron absorbing pellets;
   (i) the axial heights of one of said first and second pluralities of pellets of said first and second types located at said lower end portion of said cladding progressively varying from pellet to pellet, whereas the axial heights of the other of said first and second pluralities of pellets of said first and second types located at said lower end portion of said cladding being generally equal from pellet to pellet, so as to produce an improved reduced worth tip at said lower end portion of said cladding.

2. The control rod as recited in claim 1, wherein the respective axial heights of said high neutron absorbing pellets progressively increase from a lower end toward an upper end of said control rod lower end portion, whereas said inert pellets interspaced between said high neutron absorbing pellets are of generally equal axial heights.

3. The control rod as recited in claim 1, wherein the respective axial heights of said inert pellets progressively decrease from a lower end toward an upper end of said control rod lower end portion, whereas said high neutron absorbing pellets interspaced between said inert pellets are of generally equal axial heights.

4. The control rod as recited in claim 1, wherein said high neutron absorbing material is pelletized boron carbide.

5. The control rod as recited in claim 1, wherein said low neutron absorbing material is $ZrO_2$.

* * * * *